United States Patent
Sakurai et al.

(10) Patent No.: US 6,827,997 B2
(45) Date of Patent: Dec. 7, 2004

(54) PRESSURE-SENSITIVE ADHESIVE SHEET AND COVERED STRUCTURE

(75) Inventors: Isao Sakurai, Saitama-Ken (JP); Tomoo Ohrui, Saitama-Ken (JP); Hiroshi Koike, Saitama-Ken (JP); Shigenobu Maruoka, Saitama-Ken (JP); Tomishi Shibano, Saitama-Ken (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 09/980,677

(22) PCT Filed: Mar. 5, 2001

(86) PCT No.: PCT/JP01/01683

§ 371 (c)(1),
(2), (4) Date: Oct. 31, 2001

(87) PCT Pub. No.: WO01/64806

PCT Pub. Date: Sep. 7, 2001

(65) Prior Publication Data

US 2002/0155244 A1 Oct. 24, 2002

(30) Foreign Application Priority Data

Mar. 3, 2000 (JP) ........................... 2000-059465
Apr. 28, 2000 (JP) ........................... 2000-131443

(51) Int. Cl.[7] ............................................. C09J 7/02
(52) U.S. Cl. .................. 428/40.1; 428/40.2; 428/41.7; 428/41.8; 428/352
(58) Field of Search ........................ 428/40.1, 40.9, 428/343, 344, 354, 40.2, 41.7, 41.8, 352

(56) References Cited

U.S. PATENT DOCUMENTS

| | | |
|---|---|---|
| 4,339,485 A | 7/1982 | Shibano et al. |
| 6,218,006 B1 | 4/2001 | Tokunaga et al. |
| 6,228,449 B1 * | 5/2001 | Meyer ................ 428/40.1 |
| 2001/0021451 A1 | 9/2001 | Tokunaga et al. |

FOREIGN PATENT DOCUMENTS

| | | |
|---|---|---|
| EP | 1 013 732 A2 | 6/2000 |
| GB | 2 039 785 A | 10/1979 |
| JP | A 59 083 638 | 5/1984 |
| JP | 08245932 A | 9/1996 |
| JP | 08-245932 * | 9/1996 |
| JP | 9324517 A | 12/1997 |
| JP | 10026833 A | 1/1998 |
| JP | 11209705 A | 8/1999 |
| JP | 11228920 A | 8/1999 |
| JP | 11269436 A | 10/1999 |
| JP | 11334785 A | 12/1999 |
| JP | 2000086996 A | 3/2000 |
| JP | 2000119411 A | 4/2000 |
| JP | 2000239624 A | 9/2000 |
| JP | 2000248237 A | 9/2000 |
| JP | 2001003010 A | 1/2001 |
| JP | 2001049210 A | 2/2001 |

* cited by examiner

*Primary Examiner*—Harold Pyon
*Assistant Examiner*—Brian P. Egan
(74) *Attorney, Agent, or Firm*—Brinks Hofer Gilson & Lione

(57) ABSTRACT

A pressure sensitive adhesive sheet is described. In addition, a pressure sensitive adhesive sheet that includes a pressure sensitive adhesive sheet and a release sheet that is removably attached to the pressure sensitive adhesive sheet is described. The release sheet comprises a release sheet base and a releasing agent layer provided on the release sheet base. The releasing agent layer is substantially free of silicone compound. The base of the pressure sensitive adhesive sheet and the release sheet base are formed from a plastic film or a lint-free paper, and the count of generated particles having a diameter of 0.1 $\mu$m or more generated from the pressure sensitive adhesive sheet with the release sheet is equal to or less than 100 particles/liter when measured according to Test Method for the Measurement of Particle Generation from Sheet Materials determined by SEMI G67-0996.

10 Claims, 4 Drawing Sheets

FIG.1

TABLE 1

| | Release sheet | | | | | | | Pressure sensitive adhesive sheet | | |
|---|---|---|---|---|---|---|---|---|---|---|
| | Release sheet base | Adhesion enhancement layer | Releasing agent layer | | | | Pressure sensitive adhesive sheet base | Antistatic layer | Pressure sensitive adhesive layer |
| | Structural material | Constituent material | TPO Density (g/cm³) | PE Density (g/cm³) | Weight ratio (TPO:PE) | | Structural material | Constituent material | Constituent material |
| Example1 | Dust-free paper | - | 0.87 | 0.908 | 50:50 | | PET | - | Acrylic adhesive |
| Example2 | Dust-free paper | PE | 0.87 | 0.916 | 50:50 | | PET | - | Acrylic adhesive |
| Example3 | Dust-free paper | PE | 0.87 | 0.916 | 25:75 | | PET | - | Acrylic adhesive |
| Example4 | Dust-free paper | PE | 0.87 | 0.916 | 65:35 | | PET | - | Acrylic adhesive |
| Example5 | Dust-free paper | PE | 0.87 | 0.921 | 50:50 | | PET | - | Acrylic adhesive |
| Example6 | Dust-free paper | PE | 0.87 | 0.912 | 50:50 | | PET | - | Acrylic adhesive |
| Example7 | Dust-free paper | PE | 0.87 | 0.905 | 50:50 | | PET | - | Acrylic adhesive |
| Example8 | Dust-free paper | PE | 0.87 | 0.902 | 50:50 | | PET | - | Acrylic adhesive |
| Example9 | Dust-free paper | PE | 0.87 | 0.908 | 50:50 | | PET | - | Acrylic adhesive |
| Example10 | PET | PE | 0.87 | 0.908 | 50:50 | | PET | - | Acrylic adhesive |
| Example11 | Dust-free paper | PE | - | 0.908 | 50:50 | | Dust-free paper | - | Acrylic adhesive |
| Example12 | PET | PE | - | 0.908 | 50:50 | | Dust-free paper | - | Acrylic adhesive |
| Example13 | Dust-free paper | PE | - | 0.916 | 0:100 | | PET | - | Acrylic adhesive |
| Example14 | Dust-free paper | PE | 0.87 | 0.916 | 50:50 | | PET | - | Acrylic adhesive + Antistatic agent |
| Example15 | Dust-free paper | PE | 0.87 | 0.916 | 50:50 | | PET | tin oxide | Acrylic adhesive |
| Example16 | Dust-free paper | PE | 0.87 | 0.916 | 50:50 | | PET | Pd | Acrylic adhesive |
| Example17 | Dust-free paper | PE | 0.87 | 0.916 | 50:50 | | PET | - | Acrylic adhesive |
| Comp. Ex. | Dust-free paper | PE | - | - | - | | PET | - | Acrylic adhesive |

Note: TPO: olefin-base thermoplastic elastomer  PE: polyethylene resin

FIG.2

TABLE 2

| | Amount of Silicon Compound (µg/m²) | Amount of Ions (mg/m²) | Amount of Gas Generated (mg/m²) | Count of Generated Particles (particles/liter) |
|---|---|---|---|---|
| Example1 | ND | ND | ND | 0 |
| Example2 | ND | ND | ND | 0 |
| Example3 | ND | ND | ND | 0 |
| Example4 | ND | ND | ND | 0 |
| Example5 | ND | ND | ND | 0 |
| Example6 | ND | ND | ND | 0 |
| Example7 | ND | ND | ND | 0 |
| Example8 | ND | ND | ND | 0 |
| Example9 | ND | ND | ND | 0 |
| Example10 | ND | ND | ND | 0 |
| Example11 | ND | 10 | ND | 0 |
| Example12 | ND | 10 | ND | 0 |
| Example13 | ND | ND | ND | 0 |
| Example14 | ND | ND | ND | 0 |
| Example15 | ND | ND | ND | 0 |
| Example16 | ND | ND | ND | 0 |
| Comp. Ex. | 5000 | ND | ND | 0 |

ND: Below Measurement Limit

FIG.3

TABLE 3

| | Surface Registivity (Ω) | Volatage of Electrification at Peeling-off (kV) |
|---|---|---|
| Example14 | $1.0 \times 10^5$ | ND |
| Example15 | $1.0 \times 10^7$ | ND |
| Example16 | $1.0 \times 10^6$ | ND |
| Comp. Ex. | $1.0 \times 10^{14}$ | 5 |

ND: Below Measurement Limit

FIG.4

TABLE 4

| | Adhesive Force (g/50mm) | | Deposited Silicone Compound (Count number of Silicone) |
|---|---|---|---|
| | 23°C After three days | 70°C After one day | |
| Example1 | 14 | 14 | ND |
| Example2 | 17 | 16 | ND |
| Example3 | 21 | 21 | ND |
| Example4 | 30 | 27 | ND |
| Example5 | 16 | 16 | ND |
| Example6 | 14 | 16 | ND |
| Example7 | 15 | 15 | ND |
| Example8 | 14 | 14 | ND |
| Example9 | 14 | 14 | ND |
| Example10 | 14 | 14 | ND |
| Example11 | 30 | 30 | ND |
| Example12 | 30 | 30 | ND |
| Example13 | 170 | 200 | ND |
| Example14 | 17 | 17 | ND |
| Example15 | 17 | 17 | ND |
| Example16 | 17 | 17 | ND |
| Comp. Ex. | 10 | 10 | 1000 |

ND: Below Measurement Limit

PRESSURE-SENSITIVE ADHESIVE SHEET AND COVERED STRUCTURE

FIELD OF THE INVENTION

This invention relates to a pressure sensitive adhesive sheet and a pressure sensitive adhesive sheet with a release sheet.

BACKGROUND ART

Hard disk drives are widely used as a computer peripheral equipment.

In these hard disk drives, pressure sensitive adhesive sheets are attached for various purposes, such as temporary fixation of parts during manufacturing process, indication of the contents, inspection and closing of holes formed in a main body or a cover, and the like.

Such a pressure sensitive adhesive sheet is generally composed of a pressure sensitive adhesive sheet base and a pressure sensitive adhesive layer provided on the base, and it is being adhered to a release sheet until it is attached to a hard disk drive or the like.

On a surface of the release sheet (a surface to be attached to the pressure sensitive adhesive layer of the pressure sensitive adhesive sheet), a releasing agent layer is provided for improving reliability. Conventionally, a silicone resin has been used as a material of this releasing agent layer.

However, it is known that when such a release sheet is attached to a pressure sensitive adhesive sheet, silicone compound such as low molecular weight silicone resin, siloxane, or silicone oil contained in the releasing agent layer of the release sheet is transferred into the pressure sensitive adhesive layer of the pressure sensitive adhesive sheet. Further, normally, the release sheet is wound up in a rolled form after the production thereof, and in this state, the back surface of the release sheet is in contact with the releasing agent layer thereof, so that the silicone compound contained in the releasing agent layer is transferred to the back surface of the release sheet. In this regard, it is also known that the silicone compound transferred to the back surface of the release sheet is again transferred to the surface of a pressure sensitive adhesive sheet when winding up a pressure sensitive adhesive sheet with a release sheet (which is composed of a pressure sensitive adhesive sheet and a release sheet attached thereto) in a rolled form in manufacturing the pressure sensitive adhesive sheet with a release sheet. For this reason, it is also known that, when the pressure sensitive adhesive sheet to which such a release sheet has been adhered is attached to a hard disk drive, the silicone compound which has been transferred to the pressure sensitive adhesive layer or the surface of the pressure sensitive adhesive sheet gradually gasifiers, and then the gasified silicone compound deposits on a magnetic head, a disk surface or the like, thereby forming a fine silicone compound layer.

Further, in the case where general wood free paper, clay-coated paper or synthetic paper is used as a base of a pressure sensitive adhesive sheet or a release sheet, particles such as clay or dust of paper are generated from the base of the pressure sensitive adhesive sheet.

Meanwhile, in recent years, high performance and high density hard disc drives have been developed in a very short period of time, and it is believed that the tendency of seeking such high performance and high density will continue after this. If the tendency of such high performance and high density of hard disk drives continues further, there is the possibility that deposition of the silicone compound and deposition of the particles generated from the pressure sensitive adhesive sheet or release sheet give rise to adverse effects for reading and writing of data.

DISCLOSURE OF THE INVENTION

An object of the present invention is to provide a pressure sensitive adhesive sheet and a pressure sensitive adhesive sheet with a release sheet which are hard to give adverse effects to hard disc drives or the like.

In order to achieve the object mentioned above, the present invention is directed to a pressure sensitive adhesive sheet comprising a base and a pressure sensitive adhesive layer provided on the base, wherein the content of silicone compound in the pressure sensitive adhesive sheet is equal to or less than 500 $\mu g/m^2$.

This makes it possible to provide pressure sensitive adhesive sheets which are hard to give adverse effects to hard disc drives or the like.

Preferably, in the pressure sensitive adhesive sheet of the present invention, the amount of gas generated from the pressure sensitive adhesive sheet at a temperature of 85° C. for 30 minutes is equal to or less than 20 $mg/m^2$. This makes it possible to prevent occurrence of the adverse effects to the hard disc drives or the like more reliably.

In the present invention, it is preferred that the sum of amounts of $NO_x^-$, $Cl^-$, $PO_4^{3-}$, $K^+$, $F^-$, $Na^+$ and $Ca^{2+}$ contained in the pressure sensitive adhesive sheet is equal to or less than 20 $mg/m^2$. This also makes it possible to prevent occurrence of the adverse effects to the hard disc drives or the like more reliably.

Further, it is also preferred that the base is formed from a plastic film or a lint free paper. This makes it possible to prevent generation of particles or the like more effectively, and therefore it becomes possible to prevent occurrence of the adverse effects to the hard disc drives or the like more reliably.

Furthermore, in the pressure sensitive adhesive sheet of the present invention, it is also preferred that an antistatic layer is provided between the base and the pressure sensitive adhesive layer. This makes it possible to effectively prevent generation of electrification at peeling-off of the pressure sensitive adhesive sheet from the release sheet. Further, even in the event that voltage is generated around the attaching portion of the pressure sensitive adhesive sheet, it can be grounded safely.

In this case, it is preferred that the antistatic layer includes at least one antistatic agent selected from the group consisting of carbon black, metal-based conductive filler, metal oxide-based conductive filler and π electron conjugated conductive polymer. This makes it possible to effectively prevent transfer of ions to an adherend, and thereby poor connection and deterioration of performance in the hard disc drive can be prevented more effectively.

In this case, it is also preferred that the antistatic layer is composed of a thin film of a metal or metal oxide. This makes it possible to effectively prevent transfer of ions to an adherend, and thereby poor connection and deterioration of performance in the hard disc drive can be prevented effectively.

Furthermore, it is also preferred that the surface resistivity of the antistatic layer is in the range of $1 \times 10^4$–$10^{12}$ Ω. This makes it possible to effectively prevent generation of electrification at peeling-off of the pressure sensitive adhesive sheet from the release sheet. Further, even in the event that voltage is generated around the attaching portion of the pressure sensitive adhesive sheet, it can be grounded more safely.

Another aspect of the present invention is directed to a pressure sensitive adhesive sheet with a release sheet which comprises the pressure sensitive adhesive sheet as described above and a release sheet attached to the pressure sensitive adhesive sheet, the release sheet having a release agent layer. This makes it possible to provide a pressure sensitive adhesive sheet with a release sheet which hardly gives adverse effects to hard disc drives or the like.

In this case, it is preferred that the count of generated particles having a diameter of 0.1 $\mu$m or more generated from the pressure sensitive adhesive sheet with a release sheet is equal to or less than 100 particles/liter. This makes it possible to prevent generation of particles that are liable to give adverse effects for reading and writing data.

Further, it is also preferred that the releasing agent layer is formed of a material containing an olefin-based thermoplastic elastomer and a polyethylene resin. This makes it possible to effectively prevent an environment in which silicone compound is transferred into the pressure sensitive adhesive layer from being produced in the pressure sensitive adhesive sheet with release sheet, as well as to obtain excellent reliability.

Furthermore, it is also preferred that the weight ratio of the olefin-based thermoplastic elastomer with respect to the polyethylene resin is in the range of 25:75 to 75:25. This makes it possible to obtain especially excellent reliability and heat resistance.

Moreover, it is also preferred that the density of the olefin-based thermoplastic elastomer is in the range of 0.80 to 0.90 g/cm$^3$. The also makes it possible to obtain especially excellent reliability and heat resistance.

These and other objects, structures and advantages of the present invention will be apparent from the following detailed description of the preferred embodiments and examples.

BRIEF DESCRIPTION OF THE DRAWINGS

FIG. 1 is Table 1 which shows the results of the experiments.

FIG. 2 is Table 2 which shows the results of the experiments.

FIG. 3 is Table 3 which shows the results of the experiments.

FIG. 4 is Table 4 which shows the results of the experiments.

BEST MODE FOR PRACTICING THE INVENTION

The present invention will be described in detail below based on the preferred embodiments.

The pressure sensitive adhesive sheet with a release sheet of the present invention has a structure in which a release sheet having a releasing agent layer and a release sheet base (second base) is adhered to a pressure sensitive adhesive sheet having a pressure sensitive adhesive layer and a pressure sensitive adhesive sheet base (base) such that the releasing agent layer contacts the pressure sensitive adhesive layer. Further, the content of silicone compound contained in the pressure sensitive adhesive sheet of the present invention is 500 $\mu$g/m$^2$ or less.

In such a pressure sensitive adhesive sheet with a release sheet, the release sheet can be peeled off from the pressure sensitive adhesive sheet, and after peeling-off, the pressure sensitive adhesive sheet is attached to an adherend such an as electronic instrument (e.g., hard disk drive). Hereinbelow, an explanation will be given using a hard disk drive as the representative of the adherend.

First, an explanation will be given with regard to the pressure sensitive adhesive sheet.

The pressure sensitive adhesive sheet has a structure in which a pressure sensitive adhesive layer is formed on a pressure sensitive adhesive sheet base.

The pressure sensitive adhesive sheet base has the function to support the pressure sensitive adhesive layer, and it is constituted from, for example, a plastic film such as polyester film e.g., polyethylene terephthalate film or polybutylene terephthalate film, polyolefin film e.g., polypropylene film or polymethylpentene film, and polycarbonate film; metal foil such as aluminum or stainless steel; paper such as glassine paper, wood free paper, coated paper, impregnated paper or synthetic paper, and a laminate body of two or more of those materials.

Among these materials, it is particularly preferable that the base is constituted from a plastic film such as polyester film, e.g., polyethylene terephthalate film or polybutylene terephthalate film, or polypropylene film; or so-called lint free paper from which less particles are generated (for example, JP-B-H06-11959). When the pressure sensitive adhesive sheet base is constituted from the plastic film or lint free paper, particles and the like are hard to generate when processing or using. As a result, such a base is hard to give adversely effects to electronic instruments such as hard disk drives. Further, if the base is constituted from a plastic film or lint free paper, cutting, punching or the like during the processing becomes easy. Further, in the case where a plastic film is used as the base, it is more preferable that such a plastic film is a polyethylene terephthalate film. The polyethylene terephthalate film has the advantages in that generation of particles is low and generation of gas when heating is also low.

The thickness of the pressure sensitive adhesive sheet base is not particularly limited, but it is preferably in the range of 20–200 $\mu$m, and more preferably in the range of 25–100 $\mu$m.

Printing or typing may be applied to the surface of the pressure sensitive adhesive sheet base (surface opposite to the surface on which the pressure sensitive adhesive layer is laminated). Further, surface treatment may be made to the surface of the pressure sensitive adhesive sheet base for the purpose of, for example, improving adhesion of printing or typing (not shown in the drawings). Further, the pressure sensitive adhesive sheet may be used as a label.

The pressure sensitive adhesive layer is constituted of a pressure sensitive adhesive composition containing a pressure sensitive adhesive as a main ingredient.

Examples of the pressure sensitive adhesive include acrylic adhesive, polyester-based adhesive and urethane-based adhesives. Among these adhesives, acrylic adhesives are particularly preferable as a pressure sensitive adhesive used in the pressure sensitive adhesive layer.

When the pressure sensitive adhesive layer is constituted of an acrylic adhesive, the pressure sensitive adhesive sheet exhibits good reliability when it is peeled off from the release sheet, and also provides high adhesive strength to an adherend. In particular, in the case where the releasing agent layer is composed of an olefin-based thermoplastic elastomer and a polyethylene resin as mentioned hereinafter, reliability of the pressure sensitive adhesive sheet becomes extremely good by using an acrylic adhesive as a pressure sensitive adhesive constituting the pressure sensitive adhesive layer.

For example, in the case where the pressure sensitive adhesive layer is formed of an acrylic adhesive, such an adhesive can be constituted of a polymer or copolymer mainly containing a main monomer component for imparting adhesiveness, a comonomer component for imparting adhesiveness or cohesive force, and a functional group-containing monomer component for improving crosslinking site or adhesiveness.

Examples of the main monomer component include acrylic acid alkyl esters such as ethyl acrylate, butyl acrylate, amyl acrylate, 2-ethylhexyl acrylate, octyl acrylate, cyclohexyl acrylate, benzyl acrylate or methoxyethyl acrylate; and methacrylic acid alkyl esters such as butyl methacrylate, 2-ethylhexyl methacrylate, cyclohexyl methacrylate or benzyl methacrylate.

Examples of the comonomer component include methyl acrylate, methyl methacrylate, ethyl methacrylate, vinyl acetate, styrene and acrylonitrile.

Examples of the functional group-containing monomer component include carboxyl-containing monomers such as acrylic acid, methacrylic acid, maleic acid or itaconic acid; hydroxyl-containing monomers such as 2-hydroxyethyl (meth)acrylate, 2-hydroxypropyl (meth)acrylate or N-methylol acrylamide; acrylamides; methacrylamides; and glycidyl methacrylate.

By containing the respective components, adhesive strength and cohesive force of the pressure sensitive adhesive composition are improved. Further, because such acrylic resins generally do not have unsaturated bonding in the molecule, improvement of stability to light or oxygen can be attempted. Furthermore, by appropriately selecting kind of monomer or molecular weight of adhesive, a pressure sensitive adhesive composition having qualities and properties according to its use can be obtained.

The pressure sensitive adhesive composition used may be either of a crosslinked type to which crosslinking treatment has been applied, or a non-crosslinked type to which crosslinking treatment has not been applied. The crosslinked type is more preferable. When the crosslinked type is used, a pressure sensitive adhesive layer having further excellent cohesive force can be formed. Examples of the crosslinking agent that can be used for the crosslinked type pressure sensitive adhesive composition include epoxy compounds, isocyanate compounds, metal chelate compounds, metal alkoxides, metal salts, amine compounds, hydrazine compounds and aldehyde compounds.

If necessary, the pressure sensitive adhesive composition of the present invention may contain various additives such as antistatic agents, plasticizers, tackifiers or stabilizers.

In particular, by containing an antistatic agent in the pressure sensitive adhesive composition, it is possible to effectively prevent electrification at peeling off from being generated when the pressure sensitive adhesive sheet is peeled off from the release sheet. Further, even in the case that voltage generates in the vicinity of the attaching portion of the pressure sensitive adhesive sheet, it can be safely grounded. In this case, it is preferable that such an antistatic agent is one which does not substantially contain ions (nonionic type). Since such a nonionic antistatic agent is used, generation of ions from the antistatic agent can be effectively prevented. Therefore, it is possible to prevent ions from being transferred into a hard disk drive and its parts, and as a result, problems such as poor contact or performance deterioration in the hard disk drive can be more effectively prevented. Preferred examples of such an antistatic agent include carbon black, metal-based conductive filler, metal oxide-based conductive filler and a electron conjugated conductive polymer, which will be described later.

The content of the antistatic agent in the pressure sensitive adhesive layer is not particularly limited, but it is preferably in the range of 1–50 wt %, and more preferably in the range of 3–30 wt %. If the content of the antistatic agent is less than 1 wt %, there is the case that effect of the antistatic agent is not sufficiently obtained, on the other hand, if the content of the antistatic agent exceeds 50 wt %, there is the case that the content of the pressure sensitive adhesive in the pressure sensitive adhesive layer decreases relatively, and the adhesiveness of the pressure sensitive adhesive sheet to an adherend is also lowered.

The thickness of the pressure sensitive adhesive layer is not particularly limited, but it is preferably in the range of 1–70 $\mu$m, and more preferably in the range of 10–40 $\mu$m. With such a thickness, good adhesive force can be obtained.

In such a pressure sensitive adhesive sheet, the content of silicone compound contained in the pressure sensitive adhesive sheet is 500 $\mu$g/m$^2$ or less.

Examples of the silicone compound include low molecular weight silicone resins, silicone oils and siloxanes and the like.

If the content of the silicone compound in the pressure sensitive adhesive sheet is 500 $\mu$g/m$^2$ or less, an amount of the silicone compound discharged from the pressure sensitive adhesive sheet can be minimized when the pressure sensitive adhesive sheet is attached to an adherend. Therefore, when this pressure sensitive adhesive sheet is used, it is possible to prevent the phenomenon that the silicone compound is discharged from the pressure sensitive adhesive sheet and such silicone compound accumulates on a magnetic head or disk surface. Consequently, if the pressure sensitive adhesive sheet of the present invention is used to a hard disk drive, troubles will hardly occur in the hard disk drive, and therefore reliability of the drive is improved. Further, if hard disk drives will have higher density and higher performance in the future, the pressure sensitive adhesive sheet can prevent the hard disk drives from contamination, thereby enabling to achieve the higher density and higher performance of the hard disk drives.

Such an effect becomes prominent when the content of the silicone compound in the pressure sensitive adhesive sheet is 100 $\mu$g/cm$^2$ or less.

In the pressure sensitive adhesive sheet, the sum of amounts of $NO_x^-$, $Cl^-$, $PO_4^{3}$, $K^+$, $F^-$, $Na^+$ and $Ca^{2+}$ is preferably 20 mg/m$^2$ or less, and more preferably 5 mg/m$^2$ or less. If the pressure sensitive adhesive sheet contains a large amount of such ions, there is the possibility that after adhering the pressure sensitive adhesive sheet to a hard disk drive, such ions adhere to semiconductor elements, semiconductor materials or the like in the hard disk drive through gloves or the like of workers, thereby giving rise to adverse effects thereto. Contrary to this, if the amount of ions is decreased to the above-mentioned value or less, an amount of ions generated from the pressure sensitive adhesive sheet can extremely be decreased, and as a result, semiconductor elements, semiconductor materials or the like in the hard disk drive are hard to receive such adverse effects.

In the pressure sensitive adhesive sheet, it is preferred that an amount of gas generated at a temperature of 85° C. and for 30 minutes is 20 mg/m² or less, and more preferably 5 mg/m² or less. Examples of kinds of the gas generated from the pressure sensitive adhesive sheet include unreacted monomers or low molecular weight polymers of its resin components such as (meth) acrylic acid, (meth) acrylic acid ester or styrene; solvents such as toluene, ethyl acetate or methyl ethyl ketone; and plasticizers such as phthalic acid ester(e.g.,dioctyl phthalate, diethylhexyl phthalate or di n-decyl phthalate). If the amount of gas generated from the pressure sensitive adhesive sheet is decreased, materials to be adhered to and deposited on the surface of the hard disk or the magnetic head can be decreased. In this regard, it is considered that the amount of gas generated from the pressure sensitive adhesive sheet increases as environmental temperature of the pressure sensitive adhesive sheet becomes high. In hard disk drives or the like, there is the case that temperature inside the drives elevates during its operation. In such a case, however, it is considered that the environmental temperature is generally 80° C. or lower. Therefore,if the amount of gas generated at a temperature of 85° C. and for 30 minutes is the value lower than the above-mentioned value, the amount of gas generated from the pressure sensitive adhesive sheet is further decreased under the ordinary use conditions of hard disk drives, so that the pressure sensitive adhesive sheet can be preferably used for the hard disk drives without any problem caused by the gas generation.

Normally, the release sheet is being adhered to the pressure sensitive adhesive sheet until it is used. The above-mentioned characteristics of the pressure sensitive adhesive sheet and the pressure sensitive adhesive layer thereof depend on the release sheet, and in particular greatly depend on components and properties of the releasing agent layer. In order for the pressure sensitive adhesive sheet and pressure sensitive adhesive layer to possess the above-mentioned characteristics, it is preferable that the release sheet has the following characteristics.

The release sheet has the structure in which the releasing agent layer is formed on the release sheet base.

The material of the release sheet base is the same as that of the pressure sensitive adhesive sheet base mentioned above.

The thickness of the release sheet base is not particularly limited to a specific value, but should preferably lie in the range of 20–200 μm, and more preferably in the range of 25–50 μm.

The releasing agent layer constituted of a releasing agent is provided on such a release sheet base. By providing the releasing agent layer, it is possible to peel off the pressure sensitive adhesive sheet from the release sheet easily.

Examples of the releasing agent which can be used in the release agent layer include polyolefins such as polyethylene resins, thermoplastic elastomers such as olefin-based thermoplastic elastomers, fluororesins such as tetrafluoroethylene, and mixtures of these materials.

Among these materials, polyethylene resins and olefin-based thermoplastic elastomers are preferably used as the releasing agent in the releasing agent layer. When the release agent layer is constituted of such a releasing agent, it is possible to prevent an environment in which silicone compound is transferred into the pressure sensitive adhesive layer from being produced in the pressure sensitive adhesive sheet with a release sheet. Further, when the releasing agent layer is constituted of the polyethylene resin and the olefin-based thermoplastic elastomer, it becomes unnecessary to use any silicone resins in the production site where the pressure sensitive adhesive sheet with a release sheet is produced, and as a result, it becomes possible to prevent silicone compound from being attached to the surface of the pressure sensitive adhesive sheet base or release sheet base.

Further, since the releasing agent layer is composed of the olefin-based thermoplastic elastomer and the polyethylene resin, excellent reliability can be obtained in addition to the above-mentioned effects. Therefore,if there leasing agent layer is composed of the olefin-based thermoplastic resin and the polyethylene resin, the sum of the amounts of silicone compounds to be contained in the pressure sensitive adhesive layer and the pressure sensitive adhesive sheet base can easily be decreased to 500 μg/m² or less, and preferably to 100 μg/m² or less. Further, it is also possible to prevent accumulation of the silicone compound on a hard disk drive or the like even if the pressure sensitive adhesive sheet is used to the hard disk drive or the like. In addition, the pressure sensitive adhesive sheet can easily and securely be peeled off from the release sheet.

Furthermore, in the case that the releasing agent layer is composed of the olefin-based thermoplastic elastomer and the polyethylene resin, it is preferable that the olefin-based thermoplastic elastomer satisfies the following conditions.

The olefin-based thermoplastic elastomer may be either of ethylene propylene copolymer or ethylene octene copolymer, for example. In these materials, ethylene propylene copolymer is preferred. By using the ethylene propylene copolymer as the olefin-based thermoplastic elastomer, a release sheet having particularly excellent reliability can be obtained. As for commercially available ethylene propylene copolymer, TAFMER series (products of Mitsui Chemical Co.) can be mentioned.

Density of such olefin-based thermoplastic elastomers is not particularly limited, but it is preferably in the range of 0.80–0.90 g/cm³, and more preferably in the range of 0.86–0.88 g/cm³. If the density of the olefin-based thermoplastic elastomers is lower than the lower limit, sufficient heat resistance cannot be obtained. On the other hand, if the density of the olefin-based thermoplastic elastomers exceeds the upper limit, there is the case that sufficient reliability is not obtained.

On the other hand, density of the polyethylene resin is not particularly limited, but it is preferably in the range of 0.890–0.925 g/cm³, and more preferably in the range of 0.900–0.922 g/cm³. If the density of the polyethylene resin is lower than the lower limit, there is the case that sufficient heat resistance can not be obtained. On the other hand, if the density of the polyethylene resin exceeds the upper limit, there is the case that sufficient reliability can not be obtained.

Preferably, such polyethylene resin is synthesized using a transition metal catalyst such as Ziegler Natta catalyst or metallocene catalyst. In particular, a polyethylen resin which is synthesized using metallocene catalyst has excellent reliability and heat resistance.

In the case that the releasing agent layer is composed of the olefin-based thermoplastic elastomer and the polyethylene resin, weight ratio (compounding ratio) of the olefin-based thermoplastic elastomer with respect to the polyethylene resin is not particularly limited, but it is preferably in the range of 25:75 to 75:25, and more preferably in the range of 40:60 to 60:40. If the content of the olefin-based thermoplastic elastomer is too small, there is the case that sufficient reliability is not obtained depending on the kinds of the olefin-based thermoplastic elastomer and the polyethylene resin. On the other hand, if the content of the olefin-based thermoplastic elastomer is too large, there is the case that sufficient heat resistance is not obtained depending on the kinds of the olefin-based thermoplastic elastomer and the polyethylene resin.

In this regard, it is to be noted that the releasing agent layer may contain other resin components as well as various additives such as plasticizer or stabilizer.

The thickness of the releasing agent layer is not particularly limited, but it is preferably in the range of 10–50 $\mu$m, and more preferably in the range of 15–30 $\mu$m. If the thickness of the releasing agent layer is smaller than 10 $\mu$m, reliability is poor. Further, even if the thickness is increased more than 50 $\mu$m, reliability is not improved, thus such a releasing agent layer is not economical.

In such a pressure sensitive adhesive sheet with a release sheet, count of generated particles having a diameter of 0.1 $\mu$m or more should preferably be equal to or less than 100 particles/liter, and more preferably equal to or less than 20 particles/liter. When the count of generated particles is equal to or less than this value, it is possible to suitably prevent dusts or particles which are liable to give adverse effects on reading and writing of data from being generated from the pressure sensitive adhesive sheet.

Hereinbelow, a description will be made with regard to the production method of the pressure sensitive adhesive sheet and the pressure sensitive adhesive sheet with a release sheet of the present invention.

In one example of the manufacturing method of the release sheet, a release sheet base is prepared, and then a releasing agent is applied onto the release sheet base to form a releasing agent layer, thereby obtaining a release sheet. Examples of the method for applying the releasing agent onto the release sheet base include an extrusion laminating method and the like.

Further, in one example of the manufacturing method of the pressure sensitive adhesive sheet, a pressure sensitive adhesive sheet base is prepared, and then a pressure sensitive adhesive composition is applied onto the pressure sensitive adhesive sheet base to form a pressure sensitive adhesive layer, thereby obtaining a pressure sensitive adhesive sheet. Examples of the method for applying the pressure sensitive adhesive composition onto the pressure sensitive adhesive sheet base include knife coating, blade coating and roll coating and the like. The pressure sensitive adhesive composition used in this case may be in a solvent type, an emulsion type or a hot melt type or the like.

Thereafter, the release sheet is laminated onto the thus obtained pressure sensitive adhesive sheet such that the pressure sensitive adhesive layer contacts the releasing agent layer, so that a pressure sensitive adhesive sheet with a release sheet can be obtained.

According to these production methods, a pressure sensitive adhesive sheet with a release sheet can be produced without exposing the release sheet to high temperature in the course of the production. Further, the releasing agent layer is hard to receive influence of a solvent which is used in forming the pressure sensitive adhesive layer.

The pressure sensitive adhesive sheet with a release sheet may be produced by forming a pressure sensitive adhesive layer on the releasing agent layer of the release sheet and then superposing a pressure sensitive adhesive sheet base onto the pressure sensitive adhesive layer.

The above explanation is directed to the case that a hard disk drive is used as an adherend, but adherends to which the pressure sensitive adhesive sheet of the present invention can be used are not limited to hard disk drives.

Further, even in the case that the pressure sensitive adhesive sheet of the present invention is used in the production of hard disk drives or the like, the pressure sensitive adhesive sheet can be used without being directly attached to the hard disk drives or the like.

The pressure sensitive adhesive sheet of the present invention can also be used as, for example, a refuse-removing tape or a refuse-removing roll which is constructed by winding the tape in a rolled form. For example, when the pressure sensitive adhesive sheet of the present invention is used as a refuse-removing tape used in a production factory of hard disk drives (e.g., in a clean room), it is possible to further effectively prevent contamination of hard disk drives, thereby enabling to achieve further high performance of hard disk drives.

In the case that the pressure sensitive adhesive layer contains the above-mentioned antistatic agent, it is possible to effectively prevent generation of static electricity which is generated upon peeling-off of the release sheet from the pressure sensitive adhesive sheet, and as a result, breakage or the like of electronic parts of a hard disk drive due to static electricity can be more effectively prevented.

Herein below, a second embodiment of the present invention is will be described.

In the following, the pressure sensitive adhesive sheet with a release sheet of the second embodiment will be explained by focusing the differences between the first and second embodiments, and explanation with respect to the overlapping points is omitted.

In this embodiment, the releasing agent layer is formed on the release sheet base through an adhesion enhancing layer as an intermediate layer. That is, in this embodiment, the release sheet has a structure in which the adhesion enhancing layer is provided between the releasing agent layer and the release sheet base.

According to this structure, adhesiveness between the releasing agent layer and the release sheet base is improved. As a result, it is possible to appropriately prevent lifting from occurring at the interface between the releasing agent layer and the release sheet base when peeling off the release sheet from the pressure sensitive adhesive sheet. Further, it is also possible to prevent a part of the releasing agent layer from adhering to or remaining on the pressure sensitive adhesive layer after the release sheet has been peeled off.

As for the material constituting the adhesion enhancing layer, polyethylene resins can be mentioned, for example.

The thickness of the adhesion enhancing layer is not particularly limited, but it is preferably in the range of 10–50 $\mu$m, and more preferably in the range of 15–30 $\mu$m.

Hereinbelow, a description will be made with regard to a production method of the release sheet of this embodiment.

In this production method, a release sheet can be obtained by preparing a release sheet base, applying a constituent material of the adhesion enhancing layer onto this release sheet base, and then applying a releasing agent onto the adhesion enhancing layer to form a releasing agent layer. As for the method of applying the constituent material of the adhesion enhancing layer onto the release sheet base, an extrusion laminating method can be mentioned. In this case, the adhesion enhancing layer and the releasing agent layer may be laminated on the release sheet base in this order by the extrusion laminating method, or those layers may simultaneously be laminated on the release sheet base by a coextrusion lamination method.

In this embodiment, the intermediate layer is the adhesion enhancing layer that increases adhesive strength between the releasing agent layer and the release sheet base, but the intermediate layer may have purposes other than this. For example, the intermediate layer may be a barrier layer that prevents transfer of the components between the releasing agent layer and the release sheet base. Further, the release sheet may have two or more intermediate layers.

Hereinbelow, a third embodiment of the present invention will be described.

In the following, the pressure sensitive adhesive sheet with the release sheet of the third embodiment will be explained by focusing the differences from the first and second embodiments, and explanation with respect to the overlapping points is omitted.

In this embodiment, the pressure sensitive adhesive layer is formed on the release sheet base through an antistatic layer. That is, in this embodiment, the pressure sensitive adhesive sheet has a structure in which the antistatic layer is provided between the pressure sensitive adhesive layer and the pressure sensitive adhesive sheet base.

According to this structure, it is possible to effectively prevent electrification from being generated at the time when the pressure sensitive adhesive sheet is peeled off from the release sheet, for example. Further, even in the case that a voltage is generated in the vicinity of an attaching part of the pressure sensitive adhesive sheet, it can be grounded safely.

Further, when the pressure sensitive adhesive sheet is used as a refuse-removing tape, for example, it is possible to prevent generation of static electricity in use more effectively.

Furthermore, it is preferable that the antistatic layer does not substantially contain ions (nonionic).

Since such nonionic antistatic agent is used, generation of ions from antistatic agent can effectively be prevented. Thus, transfer of ions to the adherend can be prevented, and as a result, problems such as poor contact in a hard disk drive and deterioration of performance thereof can be effectively prevented.

Preferable examples of the nonionic antistatic layer include the following layers (1) and (2).

(1) Layers constituted of an antistatic agent composition containing at least one of antistatic agents such as carbon black, metal-based conductive filler, metal oxide-based conductive filler and π electron conjugated conductive polymer.

Examples of the metal-based conductive filler include a metal powder of Cu, Al, Ni, Sn, or Zn or the like.

In the case where carbon black or metal-based conductive filler is used as the antistatic agent, these conductive fillers are used in a state of being dispersed in a binder. Amount of the conductive filler to be added to the antistatic agent composition is not particularly limited, but it is preferably in the range of 1–90 wt %, and more preferably in the range of 3–80 wt %.

If the amount of the added carbon black or metal-based conductive filler is less than 1 wt %, there is the case that sufficient antistatic effect can not be obtained. On the other hand, if the amount of the added conductive filler exceeds 90 wt %, strength decreases, so that there is the possibility that cohesive failure of the antistatic layer or interfacial failure occurs upon peeling off the pressure sensitive adhesive sheet from the release sheet.

As for the binder, acrylic-based, urethane-based, polyester-based, epoxy-based, polyvinyl chloride-based, melamine-based or polyimide-based high molecular polymer can be used. If necessary, an additive such as crosslinking agent may be added.

Examples of the metal oxide-based conductive filler include zinc oxide-based, titanium oxide-based, tin oxide-based, indiumoxide-based and antimonyoxide-based fillers and the like.

In the case where the metal oxide-based conductive filler is used as the antistatic agent, the metal oxide-based conductive filler is used in a state of being dispersed in a binder. Amount of the metal oxide-based conductive filler to be added to the antistatic agent composition is not particularly limited, but it is preferably in the range of 10–90 wt %, and more preferably in the range of 20–80 wt %.

If the amount of the metal oxide-based conductive filler added is less than 10 wt %, there is the case that sufficient antistatic effect can not be obtained. On the other hand, if the amount of the metal oxide-based conductive filler added exceeds 90 wt %, strength decreases, so that there is the possibility that cohesive failure of the antistatic layer or interfacial failure occurs upon peeling off the pressure sensitive adhesive sheet from the release sheet.

As for the binder, those that are the same as the binder used with carbon black or metal-based conductive filler can be used, and if necessary, an additive such as crosslinking agent may be added.

In this connection, it is to be noted that the above-mentioned antistatic agent may be prepared by applying the carbon black, metal-based conductive filler, metal oxide-based conductive fillers and the like onto the surface of resin powder of polystyrene or polymethacrylate, or glass powder, by means of coating or sputtering or the like.

The π electron conjugated conductive polymer is a polymer obtained by oxidation-polymerizing a monomer having conjugated double bond in its molecular structure.

Examples of the monomer constituting the π electron conjugated conductive polymer include aniline, thiophene, pyrrole and their derivatives.

Average molecular weight of the π electron conjugated conductive polymer is not particularly limited, but it is preferably in the range from several hundred to several ten thousands.

The antistatic agent composition may contain π electron conjugated conductive polymer and metal oxide-based conductive filler. In this case, the above-mentioned binder may be contained or may not be contained.

Examples of the method for forming the antistatic layer containing π electron conjugated conductive polymer include a method of applying an antistatic agent composition containing the π electron conjugated conductive polymer to the pressure sensitive adhesive sheet base, and a method of contacting a monomer constituting the π electron conjugated conductive polymer with the surface of the pressure sensitive adhesive sheet base and polymerizing it under the presence of an oxidizing agent. In the case of using the method of contacting a monomer constituting the π electron conjugated conductive polymer with the surface of the pressure sensitive adhesive sheet base and polymerizing it under the presence of an oxidizing agent, it is possible to use a method of dipping a base film in a solution containing an oxidizing agent to polymerize monomers (dip polymerization), and directly precipitating a conductive polymer on the surface of the base film to obtain a conductive polymer layer, for example. According to this method, it is possible to optionally change monomer concentration, so that the thickness and conductivity of the conductive polymer layer can be easily controlled.

Examples of the oxidizing agent include peroxobisulfate such as ammonium peroxobisulfate or potassium peroxobisulfate, ferric salt such as ferric chloride, ferric sulfate or ferric nitrate, permanganate such as potassium permanganate or sodium permanganate, and bichromate such as sodium bichromate or potassium bichromate.

If necessary, the antistatic agent composition may contain various additives such as plasticizer, tackifier or stabilizer.

(2) Layers constituted of thin film of metal or metal oxide

Examples of the metal thin film include a thin film of Al, Ti, Au, Ag, Pd, Ni, or Pt or the like, or alloy containing one or more of these metals. This metal thin film may be one obtained by, for example, laminating a plurality of layers having different compositions.

Examples of the metal oxide thin film include a thin film of manganese oxide or titanium oxide or the like. The thin film of this metal oxide may be formed by containing a dopant to metal oxide, such as ITO or ATO. Further, the thin film of this metal oxide may contain a plurality of metal elements.

Examples of the formation method of the thin film of the metal or metal oxide include chemical vapor deposition methods (CVD) such as heat CVD, plasma CVD and laser CVD, and physical vapor deposition methods (PVC) such as vacuum deposition, sputtering and ion plating.

The antistatic layer may be formed into a laminate structure comprised of a plurality of layers having different compositions. For example, the antistatic layer may be one obtained by laminating a layer containing at least one of the antistatic agents including the above-mentioned carbon black, metal-based conductive filler, metal oxide-based conductive filler and π electron conjugated conductive polymer, and a thin film of metal or metal oxide.

Surface resistivity of the antistatic layer thus obtained is preferably in the range of $10^4$–$10^{12}$ Ω, more preferably in the range of $10^6$–$10^9$ Ω.

If the surface resistivity of the surface of the antistatic layer is less than $10^4$ Ω, there is the possibility that parts such as IC or magnetic head or the like are broken in the case of generation of voltage in some reasons. On the other hand, the surface resistivity of the surface of the antistatic layer exceeds $10^{12}$ Ω, there is the possibility that sufficient antistatic effect can not be obtained.

The thickness of the antistatic layer can be appropriately determined so as to obtain the above-mentioned surface resistivity. However, the thickness is preferably in the range of 0.01–20 μm, and more preferably in the range of 0.1–1 μm, in the case of the carbon black, metal-based conductive filler, metal oxide-based conductive filler or π electron conjugated conductive polymer. Further, it is preferable that the thin film of metal or metal oxide has a thickness of 0.005–1 μm. If the thickness of the antistatic layer is lower than the lower limit, there is the case that sufficient antistatic effect can not be obtained. On the other hand, if the thickness of the antistatic layer exceeds the upper limit, it may invite decrease in rigidity of the pressure sensitive adhesive sheet or deterioration of transparency.

In this embodiment, the intermediate layer is formed from the antistatic layer that prevents generation of releasing charges, but such an intermediate layer may have functions other than this. For example, the intermediate layer may be a barrier layer that prevents transfer of components between the pressure sensitive adhesive layer and the pressure sensitive adhesive sheet base. Further, the pressure sensitive adhesive sheet may have two or more intermediate layers. For example, the pressure sensitive adhesive sheet may have the above-mentioned antistatic layer and barrier layer as its intermediate layers.

Although the present invention has been described above based on the preferred embodiments mentioned above, the present invention is not limited thereto.

For example, the pressure sensitive adhesive sheet with a release sheet of the present invention may have a structure such that two pressure sensitive adhesive layers are formed on both sides of the pressure sensitive adhesive sheet base, and release sheets are respectively attached to each of the pressure sensitive adhesive layers.

By using this structure, it is possible to bond different adherends through the pressure sensitive adhesive sheet.

Further, the pressure sensitive adhesive layers provided on both sides of the pressure sensitive adhesive sheet base may have substantially the same thickness, composition and the like, or may have different thickness, composition and the like, respectively.

EXAMPLES

Hereinbelow, a description will be made with regard to the actual examples of the pressure sensitive adhesive sheet with a release sheet of the present invention.

1. Production of Pressure Sensitive Adhesive Sheet with Release Sheet

Example 1

A release sheet was prepared by forming a releasing agent layer onto one surface of a release sheet base by the extrusion laminating method.

Then, a pressure sensitive adhesive sheet was prepared by forming a pressure sensitive adhesive layer onto one surface of a pressure sensitive adhesive sheet base by the knife coating method.

Thereafter, by adhering the release sheet to the pressure sensitive adhesive sheet, a pressure sensitive adhesive sheet with a release sheet was produced.

The structure of each layer was as follows.

(1) Release sheet base

Structural material: polyethylene terephthalate film

Thickness: 38 μm (2) Releasing agent layer

Constituent material: A mixture of 50 parts by weight of olefin-based thermoplastic elastomer containing ethylene propylene copolymer ("TAFMER P-0280G" which is a product of Mitsui Chemical Co. and its density is 0.87 g/cm$^3$) and 50 parts by weight of polyethylene resin ("HI-αCW2004" (linear low density polyethylene) which is a product of Sumitomo Chemical Company, Limited. and its density is 0.908 g/cm$^3$). (note that the polyethylene was synthesized by Ziegler-Natta catalyst)

Thickness: 15 μm (3) Adhesion enhancing layer

None (4) Pressure sensitive adhesive layer

Constituent material: Acrylic adhesive ("NPL" which is a product of LINTEC Corporation)

Thickness: 25 μm (5) Pressure sensitive adhesive sheet base

Structural material: polyethylene terephthalate film

Thickness: 50 μm (6) Antistatic layer

None

Example 2

A pressure sensitive adhesive sheet with a release sheet was produced in the same manner as that of Example 1 excepting that a release sheet was produced by forming an adhesion enhancing layer onto one surface of a release sheet base by the extrusion laminating method, and then forming a release agent layer onto the adhesion enhancing layer by the extrusion laminating method.

The structure of each layer was as follows.

(1) Release sheet base
   Structural material: Lint-free paper ("CLEAN PAPER" which is a product of LINTEC Corporation)
   Thickness: 38 μm
(2) Releasing agent layer
   Constituent material: A mixture of 50 parts by weight of olefin-based thermoplastic elastomer containing ethylene propylene copolymer ("TAFMER P-0280G" which is a product of Mitsui Chemical Co. and its density is 0.87 g/cm$^3$) and 50 part by weight of polyethylene resin ("J-REX JH807A" (low density polyethylene) which is a product of Japan Polyolefin Co., Ltd. and its density is 0.916 g/cm$^3$). (note that the polyethylene was synthesized by Ziegler-Natta catalyst)
   Thickness: 15 μm
(3) Adhesion enhancing layer
   Constituent material: Polyethylene ("SUMIKATHEN L-405H" (low density polyethylene) which is a product of Sumitomo Chemical Company, Limited. and its density is 0.924 g/cm$^3$)
(4) Pressure sensitive adhesive layer
   Constituent material: Acrylic adhesive ("NPL" which is a product of LINTEC Corporation)
   Thickness: 25 μm
(5) Pressure sensitive adhesive sheet base
   Structural material: polyethylene terephthalate film
   Thickness: 50 μm
(6) Antistatic layer
   None

Example 3

A pressure sensitive adhesive sheet with a release sheet was produced in the same manner as Example 2 excepting that the releasing agent was produced from 25 parts by weight of olefin-based thermoplastic elastomer and 75 parts by weight of polyethylene.

Example 4

A pressure sensitive adhesive sheet with a release sheet was produced in the same manner as Example 2 excepting that the releasing agent was produced from 65 parts by weight of olefin-based thermoplastic elastomer and 35 parts by weight of polyethylene.

Example 5

A pressure sensitive adhesive sheet with a release sheet was produced in the same manner as Example 2 excepting that the polyethylene in the releasing agent was changed into a linear low density polyethylene ("NOVATEC-LL. UC380" which is a product of JAPAN POLYCHEM Corporation and its density is 0.921 g/cm$^3$). In this regard, it is to be noted that this polyethylene was synthesized by metallocene catalyst.

Example 6

A pressure sensitive adhesive sheet with a release sheet was produced in the same manner as Example 2 excepting that the polyethylene in the releasing agent was changed into a low density polyethylene ("EXCELLEN EX CR8002" which is a product of Sumitomo Chemical Company, Limited. and its density is 0.912 g/cm$^3$). In this regard, it is to be noted that this polyethylene was synthesized by metallocene catalyst.

Example 7

A pressure sensitive adhesive sheet with a release sheet was produced in the same manner as Example 2 excepting that the polyethylene in the releasing agent was changed into a low density polyethylene ("KERNEL 57L" which is a product of JAPAN POLYCHEM Co., Ltd. and its density is 0.905 g/cm$^3$). In this regard, it is to be noted that this polyethylene was synthesized by metallocene catalyst.

Example 8

A pressure sensitive adhesive sheet with a release sheet was produced in the same manner as Example 2 excepting that the polyethylene in the releasing agent was changed into a linear low density polyethylene ("SUMIKASEN E-FV401" which is a product of Sumitomo Chemical Company, Limited. and its density is 0.902 g/cm$^3$). In this regard, it is to be noted that this polyethylene was synthesized by metallocene catalyst.

Example 9

A pressure sensitive adhesive sheet with a release sheet was produced in the same manner as Example 2 excepting that the polyethylene in the releasing agent was changed into an a olefin-based linear low density polyethylene ("SUMIKATHEN Hi-αCW2004" which is a product of Sumitomo Chemical Company, Limited. and its density is 0.908 g/cm$^3$). In this regard, it is to be noted that this polyethylene was synthesized by Ziegler-Natta catalyst.

Example 10

A pressure sensitive adhesive sheet with a release sheet was produced in the same manner as Example 9 excepting that the release sheet base was changed into a polyethylene terephthalate film (its thickness was 38μm).

Example 11

A pressure sensitive adhesive sheet with a release sheet was produced in the same manner as Example 9 excepting that the pressure sensitive adhesive sheet base was formed by laminating a polyethylene ("SUMIKATHEN L-405H" (low density polyethylene) which is a product of Sumitomo Chemical Company, Limited.) onto a lint-free paper ("CLEAN PAPER" which is a product of LINTEC Corporation and its thickness was 60 μm) by the extrusion laminating method so as to have a thickness of 15 μm.

Example 12

A pressure sensitive adhesive sheet with a release sheet was produced in the same manner as Example 10 excepting that the pressure sensitive adhesive sheet base was formed from that of Example 11.

Example 13

A pressure sensitive adhesive sheet with a release sheet was produced in the same manner as Example 2 excepting that the material of the releasing agent layer was changed into polyethylene ("J-REX JH807A" which is a product of Japan Polyolefin Co., Ltd. and its density is 0.916 g/cm$^3$). In this regard, it is to be noted that the polyethylene was synthesized by Ziegler-Natta catalyst.

Example 14

A pressure sensitive adhesive sheet with a release sheet was produced in the same manner as Example 2 excepting that the pressure sensitive adhesive layer was formed of a mixture of 96 parts by weight of acrylic adhesive ("NPL" which is a product of LINTEC Corporation) and 4 parts by weight of carbon black as an antistatic agent ("DENKA BLACK DH" which is a product of ASAHI DENKA KOGYO K.K.).

Example 15

A pressure sensitive adhesive sheet with a release sheet was produced in the same manner as Example 2 excepting that the pressure sensitive adhesive layer was formed by forming an antistatic layer onto the pressure sensitive adhesive sheet base by the knife coating method, and then forming the pressure sensitive adhesive layer onto the antistatic layer by the knife coating method.

The structure of each layer was as follows.
(1) Release sheet base
  Structural material: Lint-free paper ("CLEANPAPER" which is a product of LINTEC Corporation)
  Thickness: 38 μm
(2) Releasing agent layer
  Constituent material: A mixture of 50 parts by weight of olefin-based thermoplastic elastomer containing ethylene propylene copolymer ("TAFMER P-0280G" which is a product of Mitsui Chemical Co. and its density is 0.87 g/cm$^3$) and 50 parts by weight of polyethylene resin ("J-REX JH807A" (low density polyethylene) which is a product of Japan Polyolefin Co., Ltd. and its density is 0.916 g/cm$^3$). (note that the polyethylene was synthesized by Ziegler-Natta catalyst)
  Thickness: 15 μm
(3) Adhesion enhancing layer
  Constituent material: Polyethylene ("SUMIKATHEN L-405H"(low density polyethylene) which is a product of Sumitomo Chemical Company, Limited. and its density is 0.924 g/cm$^3$)
(4) Pressure sensitive adhesive layer
  Constituting material: Acrylic adhesive ("NPL" which is a product of LINTEC Corporation)
  Thickness: 25 μm
(5) Pressure sensitive adhesive sheet base
  Structural material: polyethylene terephthalate film
  Thickness: 50 μm
(6) Antistatic layer
  Constituent material: A mixture of 67 parts by weight of tin oxide-based conductive filler ("SN-100P" which is a product of ISHIHARA SANGYOU KAISHA, LTD.) and 33 parts by weight of polyester resin ("VYLON 20 SS" which is a product of TOYOBO CO., LTD.).
  Thickness: 0.5 μm (dried thickness)

Example 16

A pressure sensitive adhesive sheet with a release sheet was produced in the same manner as Example 2 excepting that the pressure sensitive adhesive layer was formed by forming an antistatic layer onto the pressure sensitive adhesive sheet base by ion plating, and then forming the pressure sensitive adhesive layer onto the antistatic layer by the knife coating method.

The structure of each layer was as follows.
(1) Release sheet base
  Structural material: Lint-free paper ("CLEAN PAPER" which is a product of LINTEC Corporation)
  Thickness: 38 μm
(2) Releasing agent layer
  Constituent material: A mixture of 50 parts by weight of olefin-based thermoplastic elastomer containing ethylene propylene copolymer ("TAFMER P-0280G" which is a product of Mitsui Chemical Co. and its density is 0.87 g/cm$^3$) and 50 parts by weight of polyethylene resin ("J-REX JH807A" (low density polyethylene) which is a product of Japan Polyolefin Co., Ltd. and its density is 0.916 g/cm$^3$). (note that the polyethylene was synthesized by Ziegler-Natta catalyst)
  Thickness: 15 μm
(3) Adhesion enhancing layer
  Constituent material: Polyethylene ("SUMIKATHEN L-405H" (low density polyethylene) which is a product of Sumitomo Chemical Company, Limited. and its density is 0.924 g/cm$^3$)
(4) Pressure sensitive adhesive layer
  Constituent material: Acrylic adhesive ("NPL" which is a product of LINTEC Corporation)
  Thickness: 25 μm
(5) Pressure sensitive adhesive sheet base
  Structural material: polyethylene terephthalate film
  Thickness: 50 μm
(6) Antistatic layer
  Constituent material: Thin film made of Pd
  Thickness: 0.5 μm Comparative Example A pressure sensitive adhesive sheet with a release sheet was produced in the same manner as Example 2 excepting that the releasing agent layer was formed of a silicone-based releasing agent ("SRX-357 which is a product of Daw Corning Toray Silicone Co., Ltd.).

For each of the constituent materials of the releasing agent layers of the pressure sensitive adhesive sheets with the release sheets of Examples and Comparative Example, the density of the olefin-based thermoplastic elastomer (TPO) and the density of the polyethylene (PE) and the weight ratio thereof are shown in the TABLE 1 in FIG. 1. Further, the structural materials of the pressure sensitive adhesive sheet base and release sheet base of each pressure sensitive adhesive sheet with the release sheet are also shown in TABLE 1. In this connection, It is to be noted that "PET" in the TABLE means a polyethylene terephthalate film.

2. Physical Properties of Pressure Sensitive Adhesive Sheet

For each of the pressure sensitive adhesive sheets of the pressure sensitive adhesive sheets with the release sheets prepared in the above Examples and Comparative Example, an amount of silicone, amount of ions, amount of inorganic impurities which include plasticizer and amide group-containing compound, amount of gas generated and count of generated particles were measured, respectively. Measurement methods were as follows.

(1) Amount of Silicone Compound
  Each of the pressure sensitive adhesive sheets with the release sheets was being left under the environment of an average temperature of about 23° C. and an average humidity of about 65% RH for 30 days from the preparation (production) thereof. After passing the 30 days, each pressure sensitive adhesive sheet with the release sheet was cut into a square of 10×10 cm. Then, the pressure sensitive adhesive sheet was peeled off from the release sheet. Using 10 ml of n-hexane at 23° C., the pressure sensitive adhesive sheet was subjected to extraction for 30 seconds. The extracted n-hexane was dried on an agate mortar. A tablet was prepared using the dried product obtained and 0.05 g of potassium bromide, and an amount of silicone compound in the tablet was measured with abeam condenser type FT-IR (a product of Perkin-Elmer Co.; trade name "PARAGON 1000"). The content of silicone compound per unit area of the pressure sensitive adhesive sheet was determined on the basis of the measurement result obtained using a calibration curve (measurement limit: 50 $\mu$g/m$^2$).

(2) Amount of Ions

Each of the pressure sensitive adhesive sheets with the release sheets was being left under the environment of an average temperature of about 23° C. and an average humidity of about 65% RH for 30 days from the preparation (production) thereof. After passing the 30 days, each pressure sensitive adhesive sheet with the release sheet was cut into a square of 3×3 cm. Then, the pressure sensitive adhesive sheet was peeled off from the release sheet. Using 20 ml of pure water at 80° C., the pressure sensitive adhesive sheet was subjected to extraction for 30 minutes. Concentration of $NO_x^-$, $Cl^-$, $PO_4^{3-}$, $F^-$, $K^+$, $Na^+$ and $Ca^+$, respectively, in the water obtained was analyzed and measured using an ion chromatoanalyzer (a product of Yokokawa Electric Co.: trade name "IC500"). The sum of those ions contained in the pressure sensitive adhesive sheet per unit area was determined on the basis of the measurement results obtained (measurement limit: 5 $\mu$g/m$^2$).

(3) Amount of Gas Generated

Each of the pressure sensitive adhesive sheets with the release sheets was being left under the environment of an average temperature of about 23° C. and an average humidity of about 65% RH for 30 days from the preparation (production) thereof. After passing the 30 days, the pressure sensitive adhesive sheet with the release sheet was cut into a square of 5×4 cm. Then, the pressure sensitive adhesive sheet was peeled off from the release sheet. The pressure sensitive adhesive sheet was placed in a head space bottle having a volume of 50 ml. While helium gas at 85° C. was being flown in the head space bottle at a flow rate of 50 ml/min for 30 minutes, gas flown out of the head space bottle was collected with a purge and trap apparatus (a product of Nippon Bunseki Kogyo K. K.: trade name "JHS-100A") containing a tenax collector cooled to −60° C. The gas collected was gasified with a pyrolyzer and analyzed with GC-MS (a product of Hewlett-Packard Co.; trade name "5890–5971A"). Amount of gas generated from the pressure sensitive adhesive sheet per unit area was determined on the basis of the measurement results obtained (measurement limit: 20 $\mu$g/m$^2$).

(4) Count of generated Particles Having a Diameter of 0.1 $\mu$m or more

Each of the pressure sensitive adhesive sheets with the release sheets was being left under environment of an average temperature of about 23° C. and an average humidity of about 65% RH for 30 days from the preparation (production) thereof. After passing the 30 days, tests of the following three items of crumpling, friction, and tear and crumpling were conducted for particles having a diameter of 0.1 $\mu$m or more according to the Semiconductor Production Apparatus and Material International Associate Doc. No. 2362. These results were evaluated as a whole.

Crumpling: An A5 size pressure sensitive adhesive sheet with a release sheet was crumpled for 200 seconds at a rate of one time in 15 seconds.

Friction: Two A5 size pressure sensitive adhesive sheets with release sheets were prepared, and the front of one pressure sensitive adhesive sheet with the release sheet and the back of another pressure sensitive adhesive sheet with the release sheet were superposed, and the laminate thus obtained was rubbed with the palm of the hand at a rate of three times in 10 seconds for 200 seconds.

Tear and crumpling: Four portions (4 cm distance) of a A5 size pressure sensitive adhesive sheet were torn every 5 seconds, and then crumpled for 180 seconds in the same manner as in the crumpling test.

Regarding the above (1) to (4), the test results thereof are shown in Table 2 described in FIG. 2.

As shown in Table 2, the amount of silicone compound, amount of ions, amount of gas generated and count of generated particles are all very small in the pressure sensitive adhesive sheet obtained in each of Examples. On the other hand, the amount of silicone compound is very large in the Comparative Example using a silicone releasing agent.

(5) Measurement of Surface Resistivity

Measurement of surface resistivity as shown below was carried out for each of the pressure sensitive adhesive layers of the pressure sensitive adhesive sheets produced in Example 14 and Comparative Example as well as for each the antistatic layers of the pressure sensitive adhesive sheets produced in Examples 15 and 16.

The pressure sensitive adhesive sheets having the pressure sensitive adhesive layers provided thereon in Example 14 and Comparative Example and the pressure sensitive adhesive sheet bases having the antistatic layers provided thereon in Examples 15 and 16 were being left under the environment of an average temperature of about 23° C. and an average humidity of 65% RH for 24 hours.

After the above time, the pressure sensitive adhesive sheets and pressure sensitive adhesive sheet bases were cut into a square of 10×10 cm, respectively.

Then, surface resistivities with respect to the surface of each pressure sensitive adhesive layer and the surface of each antistatic layer were measured in accordance with JIS K 6911 using a surface resistivity measurement apparatus (a product of Advantest Co.: trade name "R-12704"). With respect to the surface of antistatic layer, its surface resistivity was measured prior to formation of the pressure sensitive adhesive layer.

(a) Voltage of Electrification at Peeling-off

The pressure sensitive adhesive sheets with the release sheets produced in Examples 14, 15 and 16 and Comparative Example were being left under the environment of an average temperature of about 23° C. and an average humidity of about 65% RH for 30 days after the preparation (production) thereof. After passing the 30 days, each of the pressure sensitive adhesive sheets with the release sheets was cut into a square of 10×10 cm, respectively. Then, in each of the pressure sensitive adhesive sheets with the release sheets, the pressure sensitive adhesive sheet was peeled off from the release sheet at a rate of 500 mm/min. At this time, charged potential charged onto each pressure sensitive adhesive sheet was measured from a distance of 50 mm with a current collecting potential measurement apparatus (a product of Kasuga Denki K. K.: trade name "KSD-6110") under the environment of temperature of 23° C. and humidity of 65% RH (measurement lower limit: 0.1 kV).

With respect to the above (5) and (6), their measurement results are shown in Table 3 described in FIG. 3.

As shown in Table 3, the pressure sensitive adhesive sheets with the release sheets obtained in Examples 14, 15 and 16 are hardly charged upon peeling-off.

3. Evaluation

With respect to each of the above pressure sensitive adhesive sheets with the release sheets prepared in Examples and Comparative Example, adhesive force and an amount of silicone deposited on a disk surface were measured in the following manners.

(1) Adhesive Force

A load of 100 g/cm$^3$ was applied to each of the pressure sensitive adhesive sheets with the release sheets prepared in Examples and Comparative Example at room temperature (23° C.) for 72 hours or at 70° C. for 24 hours. Then, after being left at a room temperature for 24 hours, the respective pressure sensitive adhesive sheet with the release sheet was cut into a 25 mm width, and adhesive force of the release sheet was measured.

Measurement of the adhesive force was conducted by pulling the release sheet in 180° direction at a rate of 300 mm/min using a tensile tester.

(2) Amount of Deposited Silicone Compound

Using each of the pressure sensitive adhesive sheets with the release sheets obtained in Examples and Comparative Example, an amount of silicone compound deposited on a hard disk drive was examined in the following manner.

The release sheet of the pressure sensitive adhesive sheet with the release sheet just after production was peeled off, and the pressure sensitive adhesive surfaces of the pressure sensitive adhesive sheet were adhered to each other. Then, this was cut into a square of 20×1.0 cm. 200 samples of the thus obtained pressure sensitive adhesive sheet were placed in a stainless steel-made box having an inner size of 20×11×10 cm. A 3.5 inches hard disk drive from which its surface cover had been removed was placed in the box. Then, the box was closed with a lid, and the box was being left under the condition of 60° C. and 25% RH for 30 days with a state that the hard disk drive was being operated.

Then, the hard disk drive was taken out of the box, and an amount of the silicone compound deposited on the surface of the magnetic head was measured as a count number of silicon per minute using a wavelength dispersion type X ray analyzer (a product of Oxford Instruments Co.: trade name "WDX-400")(measurement limit: 200 counts; in the case of less than 200 counts, the presence or absence of silicone compound cannot be confirmed due to influence of noise).

The measurement results of the adhesive force and the amount of silicone compound deposited are shown in the attached TABLE 4 described in FIG. 4.

As shown in Table 4, in the case of the pressure sensitive adhesive sheet obtained in Comparative Example, a large amount of silicone compound was deposited on the magnetic head of the hard disk drive. Contrary to this, in the case of each of the pressure sensitive adhesive sheets obtained in Examples, silicone was not substantially deposited on the magnetic head of the hard disk drive.

From the above results, it has been confirmed that the pressure sensitive adhesive sheets with the release sheets obtained in Examples were very hard to give adverse effects to a hard disk drive.

In addition, each of the pressure sensitive adhesive sheets with the release sheets obtained in Examples 1–16 had excellent reliability.

INDUSTRIAL APPLICABILITY

As mentioned above, according to the present invention. it is possible to obtain a pressure sensitive adhesive sheet with a release sheet and a pressure sensitive adhesive sheet that hardly give adverse effects to the environment in which the pressure sensitive adhesive sheet is being used, particularly electronic instruments such as hard disk drives, can be obtained.

In particular, if the releasing agent layer is composed of olefin-based thermoplastic elastomer and polyolefin resin, the effect of excellent reliability can be obtained, in addition to the effect that hardly gives adverse effects to electronic instruments such as hard disk drives.

What is claimed is:

1. A pressure sensitive adhesive sheet with a release sheet used for electrical or electronic equipment, comprising:
   a. a pressure sensitive adhesive sheet which comprises a base and a pressure sensitive adhesive layer provided on the base, wherein the content of silicone compound in the pressure sensitive adhesive sheet is equal to or less than 500 µg/m$^2$; and
   b. a release sheet removably attached to the pressure sensitive adhesive sheet, the release sheet comprising:
      i. a release sheet base formed from a lint-free paper having a thickness of 25–50 µm; and
      ii. a releasing agent layer provided on the release sheet base, the releasing agent layer being attached to the pressure sensitive adhesive layer of the pressure sensitive adhesive sheet and being formed of a material containing no silicone compound,
   wherein the count of generated particles having a diameter of 0.1 µm or more generated from the pressure sensitive adhesive sheet with the release sheet is equal to or less than 100 particles/liter when measured according to the Semiconductor Production Apparatus and Material International Associate Doc. No. 2362.

2. The pressure sensitive adhesive sheet with a release sheet as claimed in claim 1, wherein when the pressure sensitive adhesive sheet is used after it has been peeled off from the release sheet, the pressure sensitive adhesive sheet generates a gas at a temperature of 85° C. for 30 minutes, but the amount of gas generated from the pressure sensitive adhesive sheet is equal to or less than 20 mg/m$^2$.

3. The pressure sensitive adhesive sheet with a release sheet as claimed in claim 1, wherein the pressure sensitive adhesive sheet contains ions of $NO_x^-$, $Cl^-$, $PO_4^{3-}$, $K^+$, $F^-$, $Na^+$ and $Ca^{2+}$, wherein the sum of amounts of these ions is equal to or less than 20 mg/m$^2$.

4. The pressure sensitive adhesive sheet with a release sheet as claimed in claim 1, wherein the antistatic layer has a surface resistivity which is in the range of $1\times10^4$–$10^{12}$ Ω.

5. The pressure sensitive adhesive sheet with a release sheet as claimed in claim 1, where the pressure sensitive adhesive sheet further comprises an antistatic layer that is provided between the base and the pressure sensitive adhesive layer thereof.

6. The pressure sensitive adhesive sheet with a release sheet as claimed in claim 5, wherein the antistatic layer includes at least one antistatic agent selected from the group consisting of carbon black, metal-based conductive filler, metal oxide-based conductive filler and π electron conjugated conductive polymer.

7. The pressure sensitive adhesive sheet with a release sheet as claimed in claim 6, wherein the antistatic layer is composed of a thin film of a metal or metal oxide.

8. The pressure sensitive adhesive sheet with a release sheet as claimed in claim 1, wherein the releasing agent layer of the release sheet is formed of a material containing an olefin-based thermoplastic elastomer and a polyethylene resin.

9. The pressure sensitive adhesive sheet with a release sheet as claimed in claim 8, wherein the weight ratio of the olefin-based thermoplastic elastomer to the polyethylene resin is in the range of 25:75 to 75:25.

10. The pressure sensitive adhesive sheet with a release sheet as claimed in claim 9, wherein the olefin-based thermoplastic elastomer has a density which is in the range of 0.80 to 0.90 g/cm$^3$.

* * * * *